(12) United States Patent
Giannini Ambrosi et al.

(10) Patent No.: US 12,172,109 B2
(45) Date of Patent: Dec. 24, 2024

(54) CLOSING AND OPENING DEVICE OF A CARTRIDGE FILTER HOUSING AND RELEVANT INSTALLATION KIT

(71) Applicant: CULLIGAN INTERNATIONAL COMPANY, Rosemont, IL (US)

(72) Inventors: Antonio Giannini Ambrosi, Forte dei Marmi (IT); Angelo Serio, Calderara di Reno (IT)

(73) Assignee: CWTS S.r.l., Bologna (IT)

( * ) Notice: Subject to any disclaimer, the term of this patent is extended or adjusted under 35 U.S.C. 154(b) by 179 days.

(21) Appl. No.: 17/650,007

(22) Filed: Feb. 4, 2022

(65) Prior Publication Data
US 2023/0158426 A1    May 25, 2023

(30) Foreign Application Priority Data

Nov. 19, 2021    (IT) .......................... 102021000029381

(51) Int. Cl.
*B01D 29/96*    (2006.01)
*B01D 35/02*    (2006.01)

(52) U.S. Cl.
CPC ............. *B01D 29/96* (2013.01); *B01D 35/02* (2013.01); *B01D 2201/24* (2013.01)

(58) Field of Classification Search
CPC .... B01D 29/96; B01D 35/02; B01D 2201/24; B01D 35/30; B01D 2201/301; B01D 2201/304; B01D 2201/347
See application file for complete search history.

(56) References Cited

U.S. PATENT DOCUMENTS

2010/0072409 A1\* 3/2010 Hancock ............. F16K 17/0413
251/321

\* cited by examiner

*Primary Examiner* — Waqaas Ali
(74) *Attorney, Agent, or Firm* — Greer, Burns & Crain, Ltd

(57) ABSTRACT

A closing and opening device for cartridge filter housings, including a first body and a second body, which move relative to each other, a sealing element between the first body and the second body and moving devices of the first body with respect to the second body; the moving devices are configured to perform a relative shift between the first body and the second body, moving them close and away, to switch from the first configuration where the first body and second body are located at a first distance so that the sealing element is in a resting position to the second configuration where the first body and second body are placed at a second distance, shorter than the first distance, so that the sealing element is compressed by the first body and by the second body.

17 Claims, 5 Drawing Sheets

Fig.3
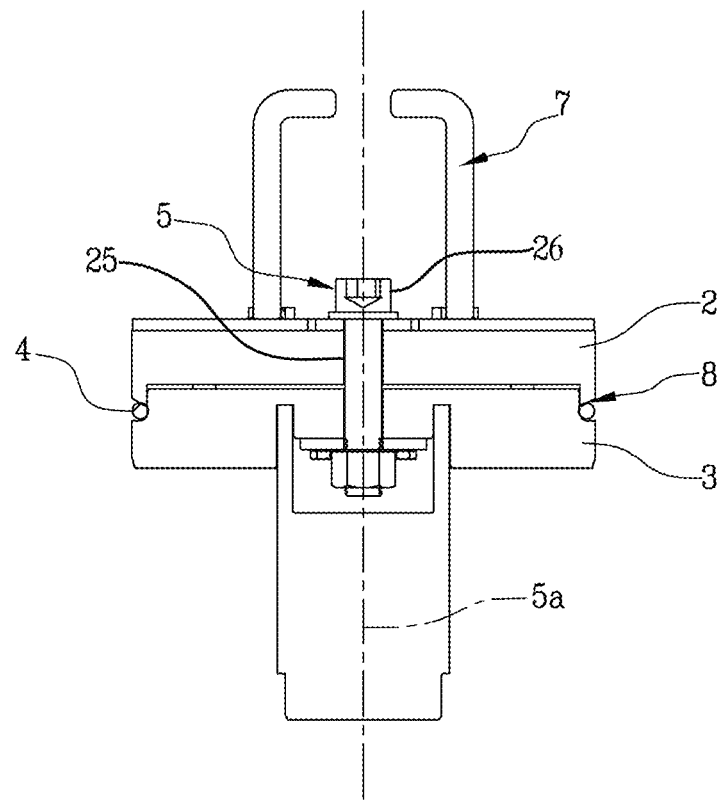
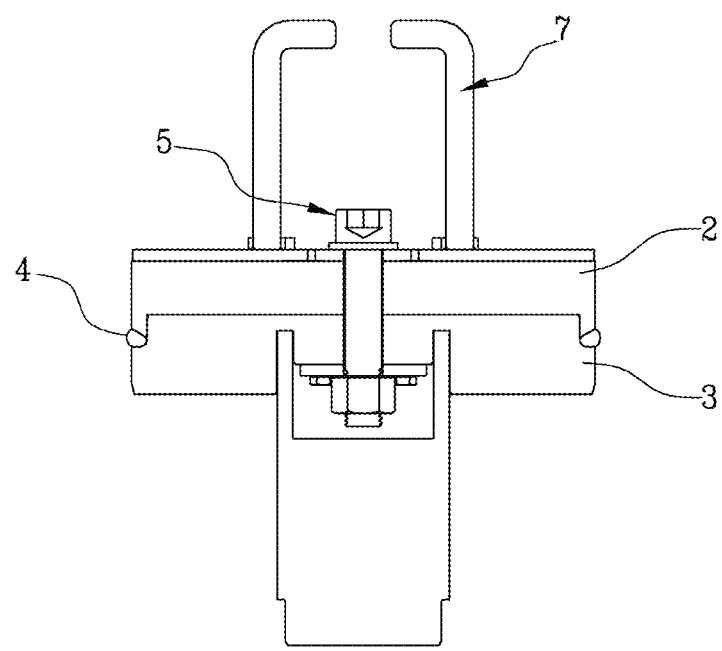
Fig.4

Fig.7
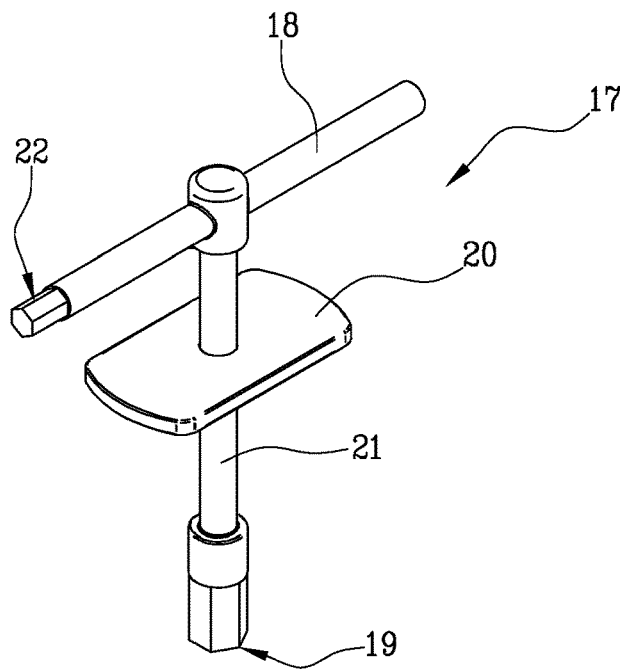
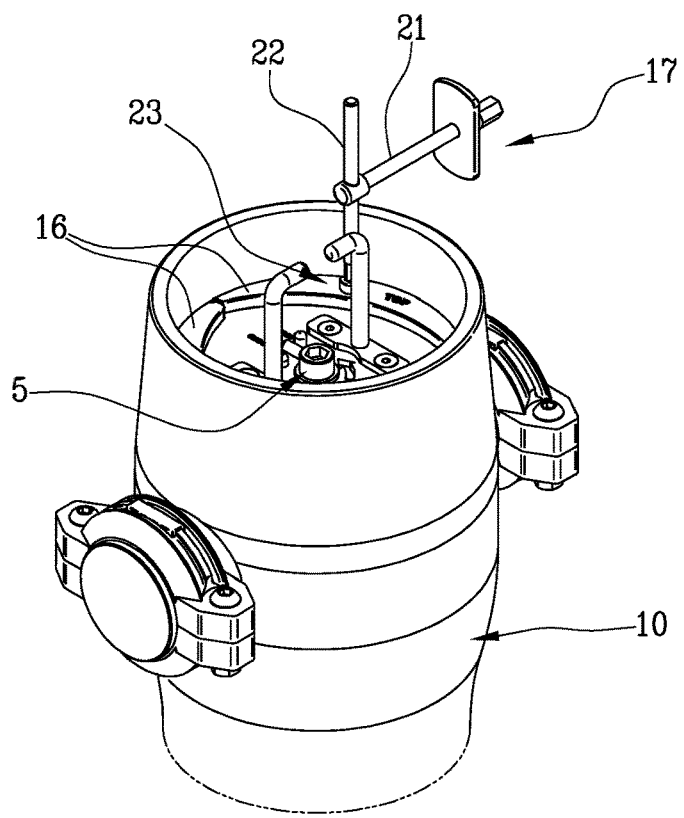
Fig.8

Fig.9
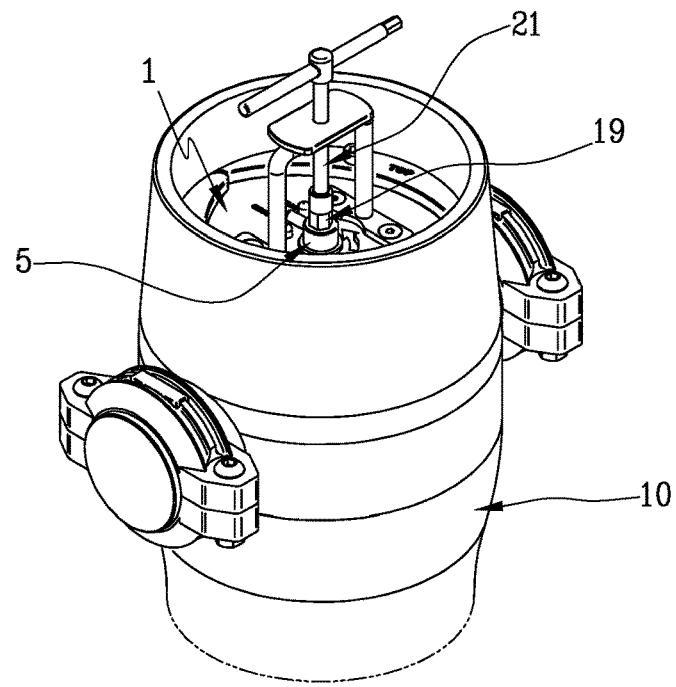
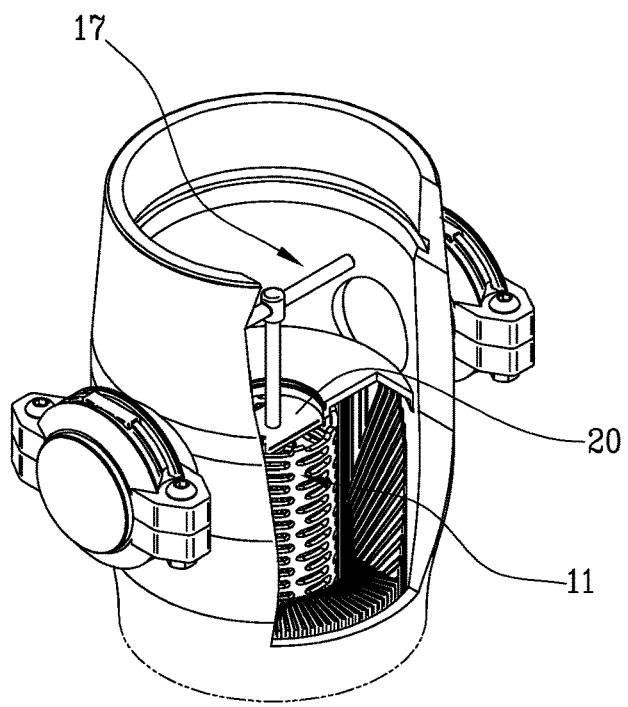
Fig.10

CLOSING AND OPENING DEVICE OF A CARTRIDGE FILTER HOUSING AND RELEVANT INSTALLATION KIT

BACKGROUND

The object of this invention is a device to open and close a cartridge filter housing and the relevant installation kit.

SUMMARY

This device is particularly effective when used in systems conveying liquids to be processed, such as chlorinated water conveying systems, which include a housing for cartridge filters that receive water to be treated.

The housing is configured to serve as a segment of a pipe of a water conveying system, with an inlet for the liquid to be treated and an outlet for the treated fluid. For maintenance purposes, cartridges are replaced periodically, which inevitably requires opening the housing they are located in and then closing the housing after the operation is completed.

In some types of systems there are many cartridge housings, so that even a single daily maintenance operation requires a significant amount of time.

For this reason, it was deemed advantageous to develop a closing and opening device for cartridge housings, including a first body and a second body, which move relative to each other, a sealing element between the first body and the second body and moving devices of the first body with respect to the second body.

The moving devices are configured to perform a relative shift between the first body and the second body, moving them alternately close and away or separated, to switch from the first configuration where the first body and second body are located at a first distance, and the second configuration where the first body and second body are placed at a second distance, shorter than the first distance, so that the sealing element is compressed by the first body and by the second body.

The benefit of the claimed device is that it is effective and safe, since it ensures the sealing of the housing, while at the same time being practical to be used in order to speed up maintenance operations of systems where the device is installed.

More specifically, a closing and opening device for cartridge filter housings is provided, including a first body and a second body, which move relative to each other, a sealing element between the first body and the second body and moving devices of the first body with respect to the second body. The moving devices are configured to perform a relative shift between the first body and the second body, moving them close and away, to switch from the first configuration where the first body and second body are located at a first distance so that the sealing element is in a resting position, to the second configuration where the first body and second body are placed at a second distance, shorter than the first distance, so that the sealing element is compressed by the first body and by the second body.

In an embodiment, the first body and the second body are configured to shift relative to each other in order to switch from the first configuration to the second configuration and vice/versa. Also, moving devices are configured to rotate around the respective rotation axis in the first direction, to switch from the first configuration to the second configuration of first body and second body, and then in the second direction, opposite to the first direction, to switch from the second configuration to the first configuration of the first body and the second body.

In another embodiment, one or more indicators are provided of the first and second configuration of the first body and second body. In another embodiment, gripping devices are provided to grasp the device itself.

In an embodiment, the first body and the second body define the seat housing the sealing element. In an embodiment, the first body and the second body are cylindrical. In an embodiment, a housing is provided for at least one filtering body, preferably a cartridge filter including a closing and opening device as described above. In a preferred embodiment, the housing includes at least a pipe with an inlet for the liquid to be treated and an outlet for the treated liquid; the filtering body is located in a position between the inlet and the outlet of the pipe. In another embodiment, the closing and opening device is located at one end of the pipe.

In another embodiment, an installation kit is provided for a closing and opening device of a respective housing as described above, including several locking bodies configured to prevent the opening and closing device from coming out of the respective housing when it is in the second configuration and a tool configured to install the closing and opening device and to install the locking bodies. In a preferred embodiment, the tool includes a plate-like body configured to mesh with the filtering body located within the relevant housing device. In another embodiment, the tool includes at least a first stem with an end portion configured to couple with the aforementioned moving devices in order to actuate them.

In another embodiment, the plate-like body is located along the first stem; the plate-like body is orthogonal to the direction of the first stem. In an embodiment, the tool includes a second stem with an end portion configured to couple with the respective tightening devices of locking bodies. In the embodiment just described, the second stem is placed at one end of the first stem opposite end portion, configured to couple with the aforementioned moving devices orthogonally with first stem in order to create a "T" shape.

BRIEF DESCRIPTION OF THE DRAWINGS

Other characteristics and benefits of this invention will become clearer in the following description, which is an indication only and therefore does not limit, some preferred manufacturing shapes of a device to open and close a cartridge filter housing and the relevant installation kit, as illustrated by the enclosed drawings, where:

FIG. 3 illustrates a side diagram view of the device in FIG. 1 in the first operating configuration;

FIG. 4 illustrates a side diagram view of the device in FIG. 1 in the second operating configuration;

FIG. 7 illustrates a perspective view diagram of a tool of the installation kit according to this invention; and FIGS. 8 to 10 show the installation steps of the device in FIG. 1 by means of the installation kit.

DETAILED DESCRIPTION

Figure 1:
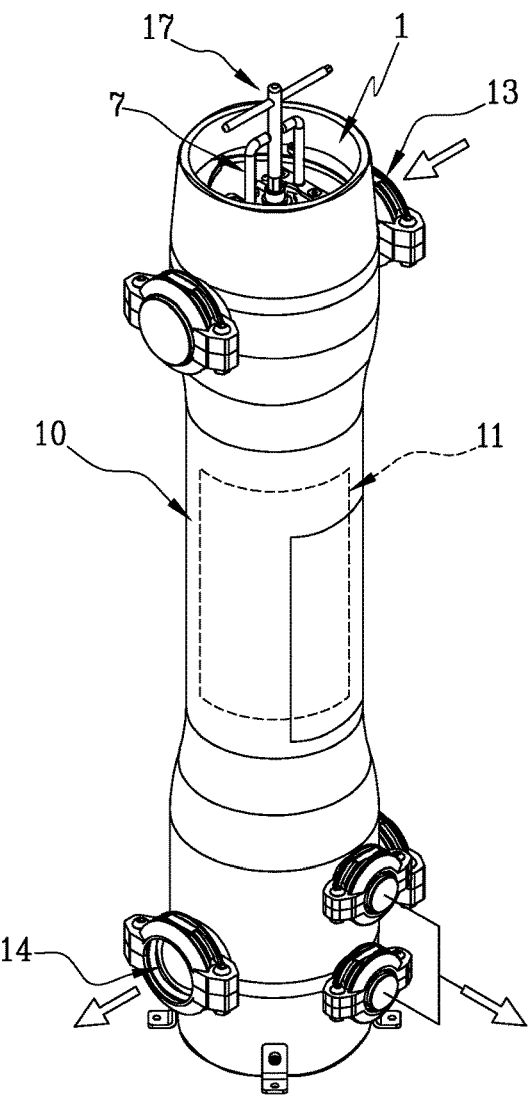
FIG. 1 is a top perspective view of a cartridge filter housing including a closing and opening device according to this invention.
Figure 2:
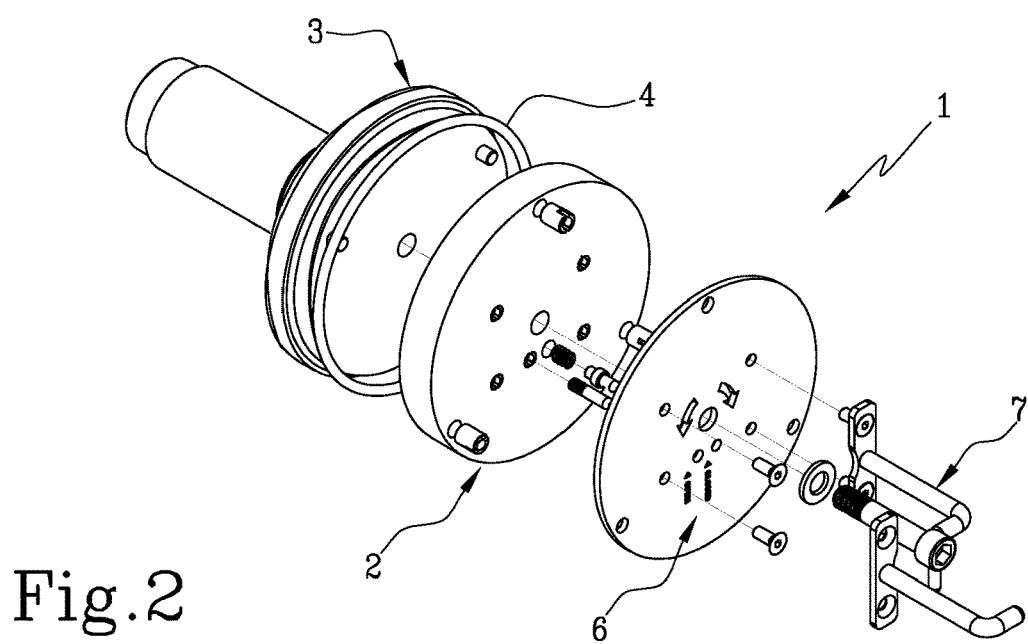
FIG. 2 illustrates a fragmentary exploded view of the device in FIG. 1.
Figure 5:
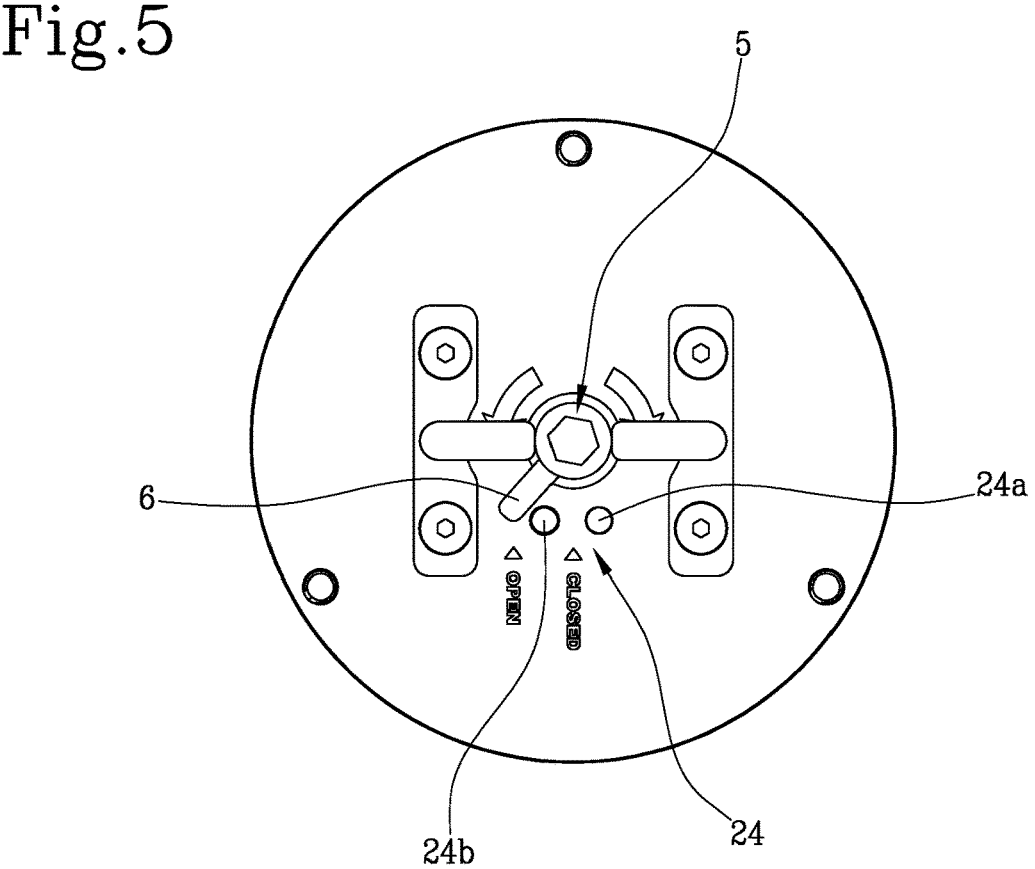
FIG. 5 illustrates a front view of the device in FIG. 3.
Figure 6:
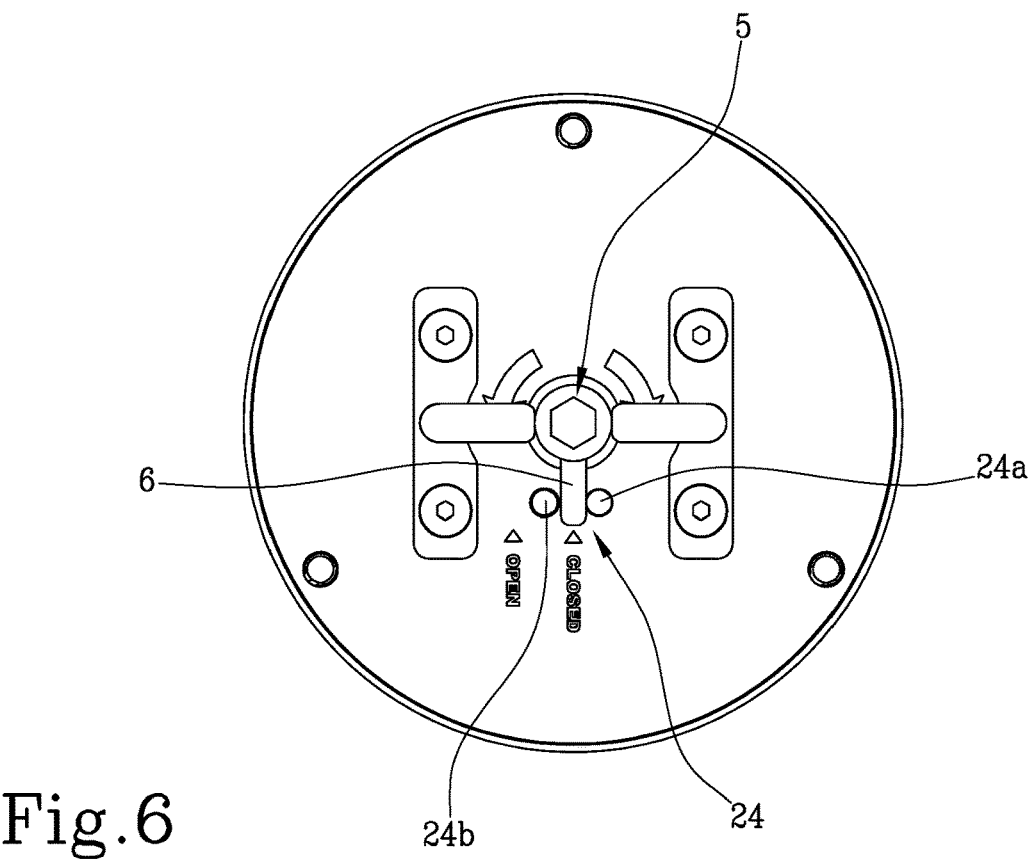
FIG. 6 illustrates a front view of the device in FIG. 4.

A device for opening and closing a cartridge filter housing according to this invention is generally designated 1. The device 1 includes a first body 2 and a second body 3, which move relative to each other and moving devices 5 to move the first body 2 relative to the second body 3. Included on the device 1 is a sealing element 4 between the first body 2 and the second body 3. The first body 2 and the second body 3 define the seat 8 housing the sealing element 4. The first body 2 and the second body 3 are preferably cylindrical.

The moving devices 5 are configured to control a relative shift between the first body 2 and the second body 3, moving them close together and away from each other, to switch from the first configuration where the first body 2 and second body 3 are located at a first distance so that the sealing element 4 is in a resting position, to the second configuration where the first body 2 and second body 3 are placed at a second distance, shorter than the first distance, so that the sealing element 4 is compressed by the first body 2 and by the second body 3. The compressed sealing element 4 has a greater radial extension compared to its radial extension in the rest condition.

Advantageously, in order to install device 1 in site, moving devices 5 are actuated to compress sealing element 4 between the first body 2 and the second body 3, moving them closer and ensuring the seal at the installation site. In order to remove device 1 from the installation site, moving devices 5 are used to bring the sealing element 4 back to the rest condition, after moving away the first body 2 from the second body 3, therefore not having any interference between the sealing element 4 and the installation site of device 1.

The first body 2 and the second body 3 are configured to shift relative to each other in order to switch from the first configuration to the second configuration and vice/versa. The relative shift provides for alternately compressing the sealing element 4, and bringing it back to its rest condition following the actuation of the moving devices 5.

The moving devices 5 are configured to rotate around the respective rotation axis 5a in the first direction, to switch from the first configuration to the second configuration of first body 2 and second body 3, and then in the second direction, opposite to the first direction, to switch from the second configuration to the first configuration of the first body 2 and the second body 3.

In one embodiment, the first direction is clockwise and the second direction is counter-clockwise. Alternatively, the first direction is counter-clockwise and the second direction is clockwise.

According to an embodiment, the moving devices 5 include a coupling between screw/lead screw. Specifically, the moving devices 5 include a stem 25 which is at least partially threaded, engaged with the first body 2 and the second body 3. The coupling devices 5 include a head body 26 configured for a male/female coupling. In the illustrated embodiment, the head body 26 has a female insert. The head body 26 is configured to couple with a tool, as described below, to actuate moving devices 5.

In order to understand the configuration of first body 2 and the second body 3, the device 1 includes one or more indicators 6 linked to the movement of the moving devices 5. The indicator 6 rotates according to the actuation of the moving devices 5. The position of the indicator 6 indicates the movement of moving devices 5, that is the first and second configuration reached by the first body 2 and the second body 3. The indicator 6 develops orthogonally to the rotation axis of moving devices 5. In the preferred embodiment, the indicator has the shape of a peg with curved head. Other shapes are contemplated.

Locking devices 24 are provided to maintain the second configuration of the first body 2 and second body 3. In the preferred embodiment, the locking devices 24 include a first element 24a and a second element 24b. Preferably, the first element 24a is fixed. The second element 24b moves from a lifted position to a lowered position in order to allow the indicator 6 to pass over it.

Contrasting or biasing devices, which are not illustrated, maintain the second element 24b in its lifted position. The contrasting devices preferably include a spring. Preferably, the external surface of indicator 6 is shaped so as to match the external surface of second element 24b, facilitating its downward movement. Therefore, the indicator 6 contrasts the force of the contrasting devices during its movement. These contrasting or biasing devices bring the second element 24b back to a lifted position after the action of indicator 6 is concluded. At the second configuration, indicator 6 is between the first element 24a and the second element 24b. At the first configuration, indicator 6 is outside the space between the first element 24a and the second element 24b.

The device 1 includes gripping devices 7 to grasp device 1 itself. In the preferred embodiment, the gripping devices 7 are in the shape of a handle.

The present invention also includes a housing 10 for at least one filtering body 11, preferably a cartridge filter, and the closing and opening device 1 of housing 10. The housing 10 includes at least a pipe 12 with an inlet 13 for the liquid to be treated and an outlet 14 for the treated liquid. The filtering body 11 is located in the pipe 12 in a segment between the inlet 13 and outlet 14. The closing and opening device 1 is located at one end of pipe 12.

The present invention also includes an installation kit for the closing and opening device 1 in the relevant housing 10. Included in the kit 15 are several locking bodies 16 configured to prevent the opening and closing device 1 from coming out of the respective housing 10 when the closing device is in the second configuration. Preferably, the locking bodies 16 are crescent-shaped. Preferably the installation kit includes three crescents. Each locking device 16 includes the respective tightening devices 23. As an example, the tightening devices are bolts, however other equivalent fasteners are contemplated.

The kit 15 includes a tool 17 configured to install the opening and closing device 1. The tool 17 includes a first stem 18 with an end portion 19 configured to couple with the aforementioned moving devices 5 in order to actuate them. Preferably, the coupling between the end portion 19 of the first stem 18 and the moving devices 5 is a male/female coupling.

In the preferred embodiment, the end portion 19 is male. Alternatively, the head body 26 of the moving devices 5 has a male insert and the end portion 19 of tool 17 has a female shape.

A plate-like body 20 is located along the first stem 18, configured to mesh with the filtering body 11 located within the relevant housing 10. In a preferred embodiment, the plate-like body 20 is orthogonal to the direction of stem 18. The plate-like body 20 is preferably located half-way along the first stem 18.

The tool 17 includes a second stem 21 with an end portion 22 configured to couple with the respective tightening devices 23 of locking bodies 16. The coupling between the end portion 22 of the second stem 21 and the tightening devices 23 of locking bodies 16 is a male/female coupling. For example, between the end portion 22 of the second stem 21 is a Hex key. The second stem 21 is placed at one end of the first stem 18 opposite its end portion 19, orthogonally with first stem 18 in order to create a "T" shape.

In operation, the replacement of the filter body 11 is performed as follows. With reference to the housing 10 of the filter body 11, close the cut-off valves and open the vent valve to release internal pressure and the drain valves to let water flow out from within the filtering body 11. Next, remove the closing and opening device 1 described above in order to access the filtering body 11. Use the end portion 22 of the second stem 21 to operate on the tightening devices 23 of locking bodies 16, unscrewing them. Next, use the end portion 19 of the first stem 20 to operate on the moving devices 5 to bring device 1 from the second configuration to the first configuration, where the sealing element 4 does not interfere with the internal walls of housing 10. In particular, moving devices 5 are turned by approx. 340°. The amount of required turn may vary to suit the application.

Next, the locking bodies 16 and the opening and closing device 1 can be removed to extract the filtering body 11. The filtering body 11 is removed by means of the plate-like body 20 located on the first stem 18 of tool 17. Then, a new filtering body 11 is provided to replace the previous one. Next, insert the closing and opening device 1 into the housing 10. Locking bodies 16 are positioned and the tightening devices 23 of the locking bodies 16 are tightened by means of the end portion 22 of the second stem 21.

Next, use the end portion 19 of the first stem 20 to operate on the moving devices 5 to bring the device 1 from the first configuration to the second configuration, so that the compressed sealing element 4 pushes against the walls of the housing. The second configuration is reached when indicator 6 is between the first element 24a and the second element 24b of the locking devices.

While a particular embodiment of the present closing and opening device of a cartridge filter housing and relevant installation kit has been described herein, it will be appreciated by those skilled in the art that changes and modifications may be made thereto without departing from the invention in its broader aspects and as set forth in the following claims.

The invention claimed is:

1. A closing and opening device for cartridge filter housings, comprising:
   a first body and a second body, which move relative to each other, a sealing element between the first body and the second body and moving devices of the first body with respect to the second body, wherein the sealing element is disposed around an exterior surface of the second body;
   the moving devices are configured to perform a relative shift between the first body and the second body, moving them close and away, to switch from a first configuration where the first body and second body are located at a first distance so that the sealing element is in a resting position, to a second configuration where the first body and second body are placed at a second distance, shorter than the first distance, so that the sealing element is compressed by the first body and by the second body wherein the sealing element is an O-ring and the moving devices include a stem which is at least partially threaded and a head body with a female insert.

2. The device according to independent claim 1, wherein the first body and the second body are configured to shift relative to each other in order to switch from the first configuration to the second configuration and vice/versa.

3. The device according to claim 1, wherein the moving devices are configured to rotate around the respective rotation axis in the first direction, to switch from the first configuration to the second configuration of the first body and the second body, and then in the second direction, opposite to the first direction, to switch from the second configuration to the first configuration of the first body and the second body.

4. The device according to claim 1, wherein including one or more indicators of the first and second configuration of the first body and second body.

5. The device according to claim 1, wherein the closing and opening device includes gripping devices to grasp the device itself.

6. The device according to claim 1, wherein that the first body and the second body define the seat housing the sealing element.

7. The device according to claim 1, wherein the first body and the second body are cylindrical.

8. A housing for at least one filtering body comprising a cartridge filter including the closing and opening device of housing according to claim 1.

9. The housing according to claim 8, wherein the closing and opening device includes at least a pipe with an inlet for the liquid to be treated and an outlet for the treated liquid; the filtering body is located in a position between the inlet and the outlet of the pipe.

10. The housing according to claim 8, wherein the closing and opening device is located at one end of pipe.

11. An installation kit for a closing and opening device of a respective housing according to claim 1, including several locking bodies configured to prevent the opening and closing device from coming out of the respective housing when the closing and opening device is in the second configuration and a tool configured to install the closing and opening device and to install the locking bodies.

12. The kit according to claim 11, wherein the tool includes a plate-like body configured to mesh with the filtering body located within the relevant housing device.

13. The kit according to claim 11, wherein the tool includes at least a first stem with an end portion configured to couple with the aforementioned moving devices in order to actuate them.

14. The kit according to claim 13, wherein the plate-like body is located along the first stem; the plate-like body is orthogonal to the direction of the first stem.

15. The kit according to claim 11, wherein the tool includes a second stem with an end portion configured to couple with the respective tightening devices of locking bodies.

16. The kit according to claim 15, wherein the second stem is placed at one end of the first stem opposite end portion, configured to couple with the aforementioned moving devices orthogonally with first stem in order to create a "T" shape.

17. The device according to claim 5, wherein the gripping devices are in the shape of handles.

* * * * *